Nov. 2, 1965     E. UMBRICHT ETAL     3,215,260
RECIPROCATING TYPE CONVEYOR
Filed March 13, 1962     3 Sheets-Sheet 1
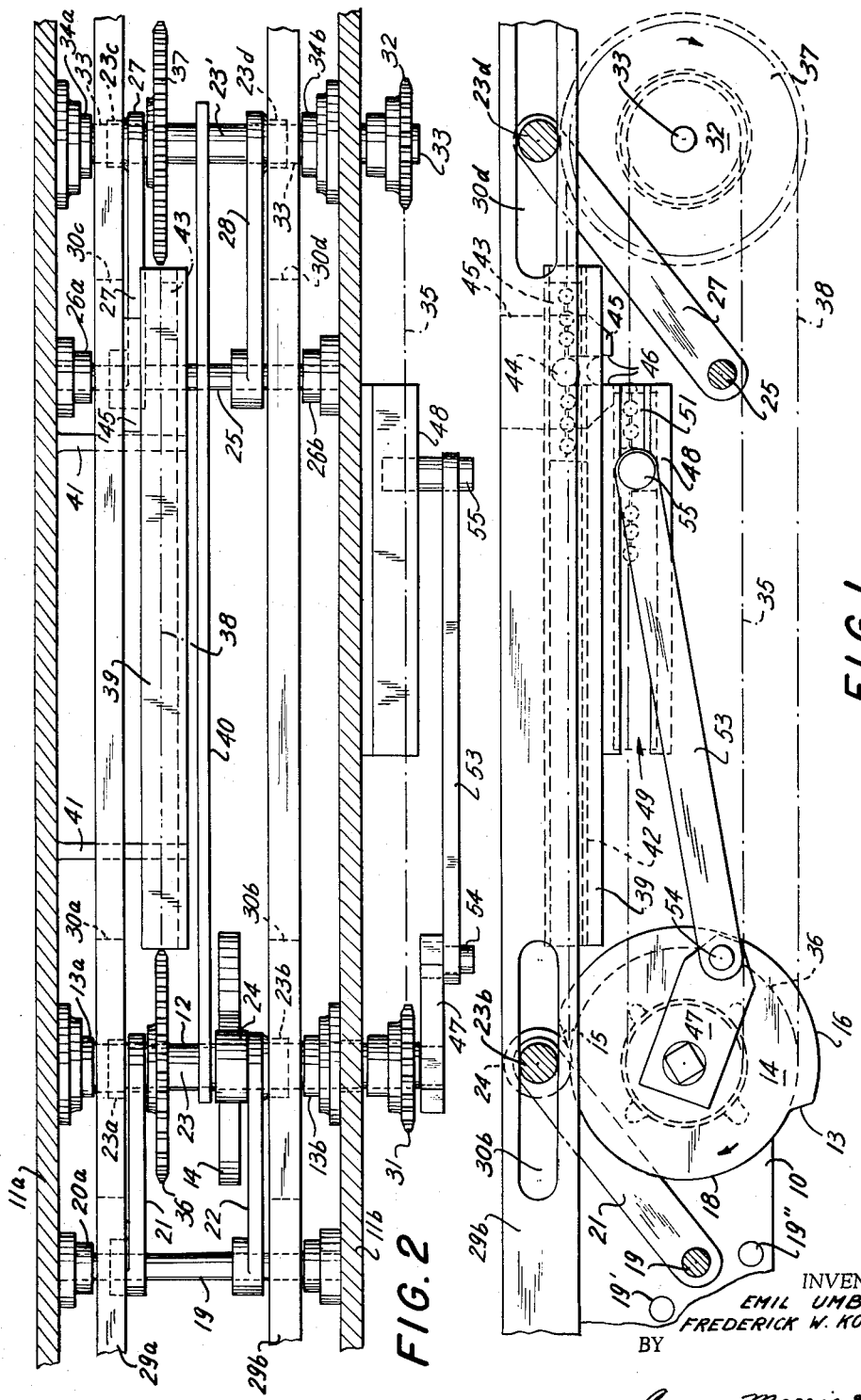
INVENTORS
EMIL UMBRICHT
FREDERICK W. KOEPKE Jr.
BY
Curtis, Morris & Safford
ATTORNEYS INVENTORS
EMIL UMBRICHT
FREDERICK W. KOEPKE Jr.
BY
Curtis, Morris & Safford
ATTORNEYS

United States Patent Office 3,215,260
Patented Nov. 2, 1965

3,215,260
RECIPROCATING TYPE CONVEYOR
Emil Umbricht, Northville, and Frederick W. Koepke, Jr., Redford, Mich., assignors to Ajem Laboratories, Livonia, Mich.
Filed Mar. 13, 1962, Ser. No. 179,412
3 Claims. (Cl. 198—219)

The invention relates to transfer devices and more particularly to devices adapted to transfer a succession of articles from station to station along a predetermined path.

In the mass production industry and especially with the advent of automation, there is need for such transfer devices which will carry articles to, and hold them in predetermined locations for precise periods of time and then move them on to succeeding locations. Conveyor belt systems have been widely used but are not able to completely fulfill this need.

More recently, walking beam-type machines have been utilized having separate hydraulic motors to effect vertical and horizontal movement, respectively. These have devoted considerable space to motors and mechanism and auxiliary equipment, such as pumps, reservoirs, valves and electronic valve control devices. In a copending application of Emil Umbricht, Serial No. 50,138, filed August 17, 1960 (attorneys' docket No. 123,296) a "walking beam" type of transfer device is disclosed driven by a single electric motor and translational mechanisms such as cams and cranks for taking off the required vertical and horizontal motions from the single rotary drive; but these mechanisms also have taken up very considerable space.

One object of the present invention is to provide transfer devices more economical of space.

Another object of the invention is to provide a transfer device capable of a relatively long horizontal movement, compared with vertical movement. Another object is to provide for independent determination of vertical and horizontal movement.

Another object of the invention is to provide a transfer device capable of relatively long horizontal movement produced by relatively small driving motion, e.g., of a crank or the like.

Another object of the invention is to provide a transfer device in which a single motive source gives relatively independent horizontal and vertical movement in raising and lowering articles from their rest positions and moving them from one position to another.

Another object of the invention is to provide a transfer device capable of smooth acceleration and deceleration, both horizontal and vertical, so as not to cause shock to the device or the articles or to throw them out of their intended exact positions.

Another object of the invention is to provide a transfer device which will raise and lower articles while keeping the horizontal movement nearly negligible and move them horizontally while substantially avoiding vertical movement.

Another object of the invention is to provide a transfer device adaptable to operation to different elevations and adaptable to a wide range of speeds.

Another object of the invention is to provide a transfer device capable of positively holding articles at successive places in the sequences of operations.

A still further object of the invention is to provide a transfer device which is dependable, rugged, compact, uncomplicated, and inexpensive, involving no undue maintenance in service.

With these objects in view, we have reduced the space requirements for transfer mechanisms, such as hydraulic motors, cams, etc., as used heretofore, by providing a relatively small master control device, advantageously a cam for vertical lift where relatively short motion is required, and a crank or other device for converting rotary to reciprocating motion for horizontal transfer, and multiply the travel thus established by a gear train in the drive between the prime mover (advantageously an electric motor) and the transfer bars to be driven thereby. Such mechanical advantage linkage may be gear trains with any type of gears ending with a pinion meshing with a rack on the transfer beam to give the horizontal motion (or the equivalent, e.g., a sprocket and chain with the final connection to the transfer bar being on a straight portion of a chain, so that it and its drive sprocket acts essentially the same as a rack and pinion to convert the rotary drive of the multiplier train to rectilinear motion as applied to the transfer bar). Levers, especially levers having short and long arms on the same side of the fulcrum pivot may also be used as the travel multiplier if connected in a "train," so that no lever is so long as to require added space beyond dimensions readily available. In either case the "train" gives relatively long travel in a horizontal direction, with low space requirement for the transfer mechanism.

Such mechanisms provide versatile and independent adjustment of height of lift and length of horizontal transfer, e.g., by replacing cams with greater or less radial difference between the high and the low dwell portions and with different slope on the lift and lowering portions, as may be desired, to increase or decrease travel and lift distances, or to give more or less rapid acceleration and deceleration within the time when horizontal transfer is substantially nil. Likewise, cranks, gears, sprockets and levers, etc., may be changed to give the desired multiplication of lift and transfer distances, respectively.

Other objects will appear, and a fuller understanding of the invention may be had from the following description and claims, taken in conjunction with the accompanying drawings in which:

FIGURE 1 is a fragmentary sketch in side elevation, of a representative portion of a transfer device embodying the present invention, with the side frame omitted for better showing of the operating parts, and with the sprocket chains broken away and represented diagrammatically by dash-dot lines.

FIGURE 2 is a top plan view of the device of FIGURE 1.

Figure 3:
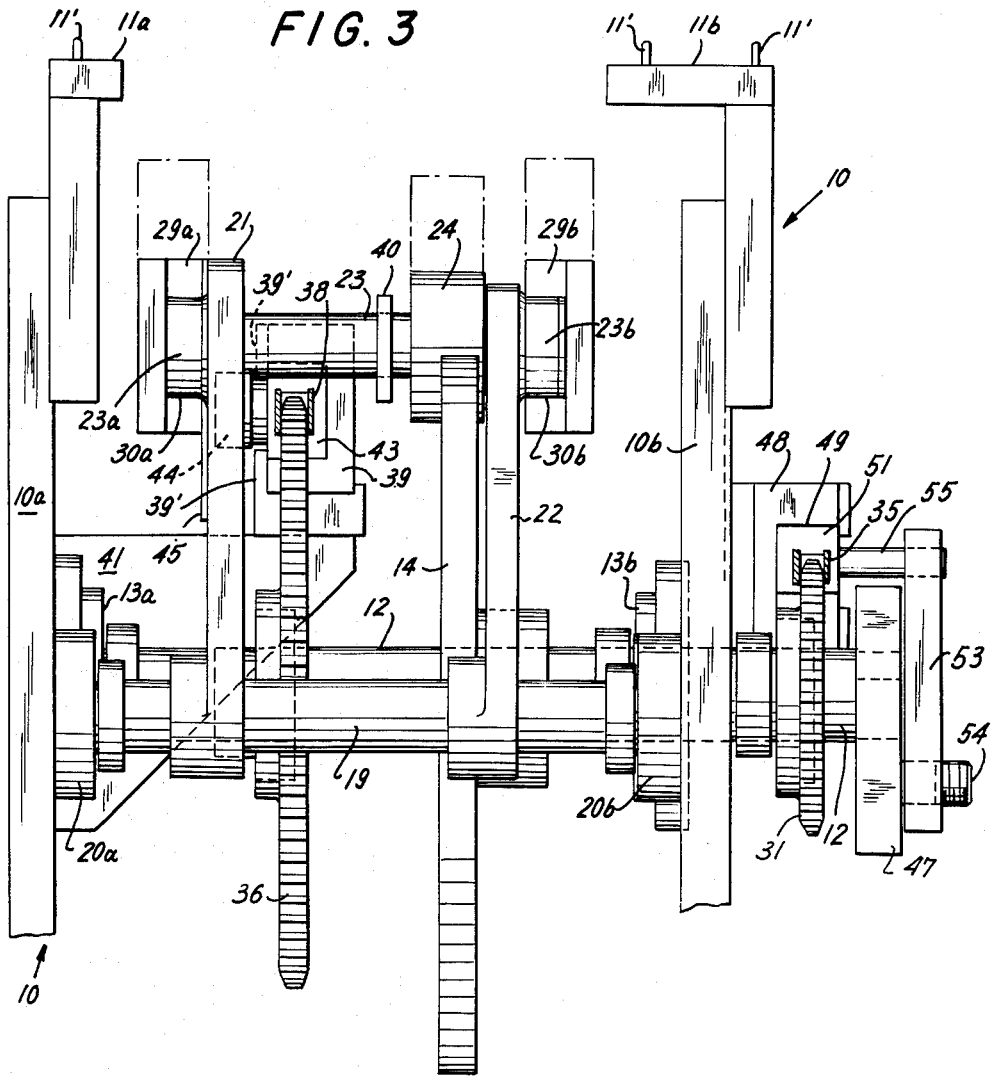
FIGURE 3 is an end elevation taken from the left end of FIGURE 1.

With reference to FIGS. 1–3 of the drawings, the embodiment of the invention there shown includes a frame 10 having sides 10a and 10b and a pair of opposed substantially parallel longitudinally extending stationary rest supports 11a and 11b secured at the top thereof. Articles to be transferred are supported on these rest supports and accurately positioned by holding pins 11'.

A shaft 12 is rotatably mounted in bearings 13a and 13b on side frames 10a and 10b.

An electric motor, not shown, rotates the shaft by a power transmission connection, e.g., engaging shaft 33 through a gear reducer. The shaft 12 has a cam wheel 14 fixed thereon. A sloping portion 15 of the cam provides a lift period, an arcuate portion 16 provides a dwell period at the high position, the slope 17 provides a lowering period, and the arcuate portion 18 provides a dwell at the low level. It is within the scope of the invention to vary the radii and slopes at these portions of the cam to provide varying vertical movement of the device as hereinafter explained. The cam wheel 14 is advantageously made of heavy steel.

A second shaft 19 is rotatably mounted in bearings 20a and 20b on the side frames 10a and 10b. Two opposed substantially parallel swing links 21 and 22 are keyed or pinned on shaft 19. These lift links have rollers 23a and 23b, respectively mounted on a cross axle 23 at their upper ends extending outward laterally therefrom. Lift link 22 also has a cam follower 24 on the back of its free end positioned to ride on the peripheral edge of the cam wheel 14.

The third shaft 25 (see the right end of FIGURES 1 and 2) is rotatably mounted in bearings 26a and 26b on the side frames 10a and 10b, respectively. Two opposed, substantially parallel, lift links 27 and 28 (see right-hand end of FIGURES 1 and 2) are fixed on shaft 25. The free ends of lift links 27 and 28 have a cross axle 23' with rollers 23c and 23d, respectively, extending laterally therefrom. Lift links 27 and 28 are held substantially parallel to lift links 21 and 22, and operated in tandem therewith, by means of the link 40 connecting the cross shafts 23 on arms 21–22 and 27–28, respectively.

Two longitudinally parallel transfer bars 29a and 29b are supported on the rollers 23a–d of lift arms 21, 22, 27, and 28, respectively. Slots 30a–d respectively receive the corresponding rollers which move longitudinally therein to accommodate the longitudinal component of the motion of the lift links.

Transfer bar 29b is connected to lift arms 21 and 27, and transfer bar 29a is connected to lift arms 22 and 28. The two transfer bars are interconnected by means of the cross axles or bars 23, 23', so that they move in concert. Locating saddles or pins similar to 11' may be used on these transfer bars to assume exact placement of the carried particles and avoid sliding along the transfer bars. However, the present structure has the great advantage of smooth acceleration and deceleration and of moving horizontally only after sufficient vertical movement so that the full weight of the article is on the transfer bars, so that there is almost no danger of the articles slipping or shifting on the transfer bars.

A sprocket wheel 31 shown in FIGURE 2 is mounted for free rotation, as an idler, on shaft 12 at the outer end thereof. A corresponding sprocket wheel 32 in tandem therewith is keyed on a fourth shaft 33, which is rotatably mounted in bearings 34a and 34b at the side frames 10a and 10b, respectively. A sprocket chain 35, represented diagrammatically by a dash-dot line, except for a few links near its ends, is tightly looped around and between sprocket wheels 31 and 32, so as to transmit driving force with substantially zero slippage. Second and third sprocket wheels 36 and 37 are keyed on shafts 12 and 33, these sprocket wheels 36 and 37 which are larger than sprocket wheels 31 and 33, are connected by a chain 38 similarly represented. A shear pin, magnetic coupler, friction coupler, or other safety device, may be interposed in the drive connections, e.g. between sprocket wheels 37 and 32, to provide for release at a predetermined torque, if jamming of the equipment should occur.

A guide bar 39, having a channel extending its entire length with flanges 39' (see FIGURE 3) overhanging the channel is mounted on the side frame 10a, by a bracket support 41.

The longitudinal channel in this guide 39 serves as a chain guide and track for a coupling member 43, shown in FIGURES 1 and 3. Member 43 comprises a slide block adapted to slide in channel 39, and connected to the ends of chain 38. A driving roller 44 extends laterally from slide 43, as shown in FIGURES 2 and 3, to engage in the vertical slot of fork member 45 on transfer bar 29a.

The fork 45, best shown in FIGURE 1 is attached to the rear transfer bar 29a (left on FIGURE 3).

Referring back to FIGURE 1, fork 45 has vertical drive surfaces 46 which coact with roller 44. Conversely, drive surface 46 could be located on slide 43, with roller 44 extending laterally from the transfer bar 29a.

At the front end of shaft 12 is shown a crank 47 keyed to the shaft so that it turns with the cam wheel 14. The free end of the crank substantially bisects the high dwell 16 of cam wheel 14.

The right portion of FIGURE 3 shows a chain guide 48 similar to guide 39 and, like it, having a lubricated channel 49 extending its length and encompassing a portion of the upper part of the chain 35 between sprocket wheels 31 and 32. Chain guide 48 is mounted on side frame 10b. A slide 51 comprises clamping jaws fitted to ends of chain 35 and a center pivot stud 55. The exterior of slide 51 fits into and slides in channel 49. A connecting rod 53 is pivotally connected at one end to the slide by stud 55 on the pivot block and at its other end to crank 47 by pivot pin 54.

The mechanism herein described is versatile for adjustment to different vertical lift and horizontal transfer distances as may be required for different articles or in different processing operations. To get a greater or less lift the cam 14 may be replaced by one having higher or lower lift and lowering slope portions 15 and 17. Also the crank arm 47 may be replaced with a shorter or longer one or may be made with holes at different radial distances to vary the horizontal throw of the driving link 53; or one or both of the sprocket and chain assemblies 31–32–35 and 36–37–38 may be replaced to give a different ratio of sprocket radii 31, 32 to 36, 37 and thereby provide mechanical advantage required to give the desired horizontal transfer movement.

Ordinarily the swing links 21, 22, 27 and 28 can remain without change throughout the range of such adjustments or substitutions but it is sometimes desirable to provide a series of alternate holes, e.g., as indicated at 19' and 19" in any of which the shaft 19 may be mounted and the swing arms 21, 22 may be pivoted. Thus the lower position 19" can be used with a cam having lower lift and lowering sections 15 and 17, and the upper pivot positions 19' for a cam with higher lift. Although it is desirable to have the swing links 21, 22 parallel to, and of the same length between pivots as, the links 27 and 28, that is not always requisite. By making 27 and 28 longer than 21 and 22, the right end of the beams 29 may be lifted higher than, or dropped lower than, the left end, or vice versa.

In operation, assuming a counterclockwise rotation of shaft 12 with cam wheel 14 and crank 47, as seen in FIGURE 1, the cam follower 24 is about to enter the lift period at 15 on the cam wheel 14. During the lift period, lift arms 21 and 22 are swung upward on shaft 19 by cam follower 24. This elevates the transfer bars 29a and 29b; and at the same time these bars are elevated by the other lift arms 27 and 28 which are swung up, to lift the other ends of bars 29a and 29b, by link 40 and connecting the shaft 23 on the outer ends of arms 21 and 22 with shaft 23'; the transfer bars are elevated above the level of the stationary rest supports 11a and 11b and thus lift an article off the stationary rest supports.

During this operation the crank 47 is so near its dead center position, that there is substantially no horizontal travel produced.

The cam follower 24 now enters the high dwell period 16 of cam wheel 14, maintaining the transfer bars 29a and 29b at their raised position. Obviously, by varying the radius of the lift-dwell periods 15 and 16, bars 29a and 29b can be lifted to different heights. A similar result can be attained by use of longer links 21, 22 and 27, 28. Also, it is within the scope of the invention to utilize two cam wheels 14 and provide a cam follower 24 on the lift arm 21 to coact with the second cam wheel.

Crank 47 first pushes then pulls chain 35 through connecting rod 53 acting upon slide 51 while the transfer bars 29a and 29b are at their high and low positions, respectively. Since sprocket wheels 37 and 36 have more teeth than sprocket wheels 32 and 31, chain 38 moves a greater distance horizontally than chain 35. Thus a relatively small eccentric motion of a crank 47 is amplified by the gear train to a relatively large horizontal movement transmitted to the chain 38, and through it to transfer bars 29a and 29b. Sprocket wheels 31 and 36 rotate freely on shaft 12 so that their reciprocating movements do not affect, and are not affected by, the unidirectional rotary movement of shaft 12.

As the middle of the high dwell 16 on cam 14 approaches the cam follower 24, the crank 47 transmits increasingly accelerated horizontal movement to the transfer bars 29a and 29b, pulling them towards the left on FIGURE 2. Because the transfer bars 29a and 29b have lost-motion connection with the ends of the lift arms 21, 22, 27 and 28 by means of slots 30a–d in said bars and rollers 23a–d on shafts 23 and 23', the horizontal component of the swing of the lift arms is not transmitted to the lift bars.

Crank 47 has its free end bisecting the dwell period 16 of the cam wheel 14 and is substantially on dead center as roller 24 starts up the lift period. Thus relatively little horizontal movement is transmitted to the transfer bars 29a and 29b during the lift period. The same result is accomplished during the lowering period 17, whereas during the dwell period 16 the bars 29a and 29b are first accelerated horizontally and then decelerated until, in the lowering period 17, the article is lowered by the transfer bars 29a and 29b, substantially without horizontal motion, at its new location closer to the left end of FIGURE 1. During the dwell 18, the crank 47 transmits motion to the transfer bars 29a and 29b, which, being now below the level of the stationary rest supports, move to the right on FIGURE 1 without affecting the article, preparatory to beginning a new lift period at 15 for moving a second article.

The drive surfaces 46 on fork 45 are longer than the vertical travel effected by links 21, 22 and 27, 28, so that the elevation of the transfer bars 29a and 29b will never lift the cam surface 46 entirely off the rollers.

As a consequence of this structure depicted in FIGURES 1–3, the transfer bars will move on a substantially rectangular path having slightly curved ends. The drive surface 46 may, however, be contoured to approach more perfect rectilinear motion of the transfer bars 29a and 29b. Sprocket wheels 36 and 37 and chain 38 may be replaced by a rack and pinion, the rack may ride in a channel, like 39 or 49, and a pinion gear would then replace sprocket wheel 37, the teeth of the rack meshing with the teeth of the pinion gear and the rack would have deep slots, or bearing surfaces, to coact with pins 44, or rollers, extending laterally from one of the transfer bars 29a or 29b. The slots would be deep to accommodate the horizontal component of the swing links during the elevating movement of the transfer bars 29a and 29b and, as before, the pins will never move off the drive faces 46.

Figure 4:
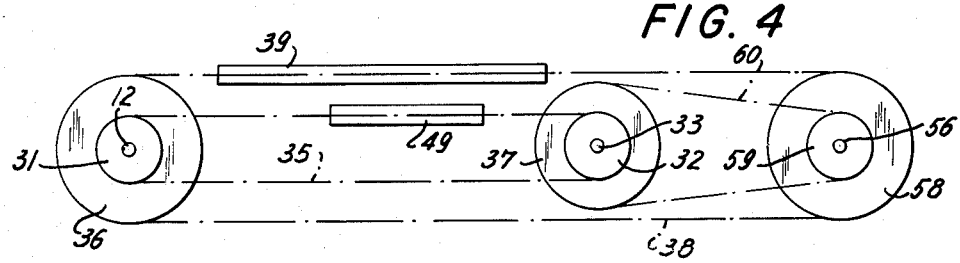
FIGURE 4 is a schematic side view of a sprocket and chain system of a second embodiment of the invention.
Figure 5:
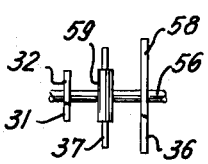
FIGURE 5 is a schematic fragmentary view of the sprocket and chain system of the invention taken from the right hand end of FIGURE 4, showing relative lateral displacement; and, FIGURE 6 is a schematic fragmentary view of the rack and pinion system of this invention which may be substituted for the chain and sprockets of FIGURE 1.

To further increase the ratio of horizontal movement of the transfer bars 29a and 29b to the horizontal movement of the chain 35, a fifth shaft 56 may be rotatably mounted at the extreme right of FIGURE 3, not shown in that diagrammatic figure but in bearings similar to bearings 13a–b, and 34a–b such an arrangement is shown diagrammatically in FIGURE 4.

In FIGURE 4, sprocket wheel 37 is offset from sprocket wheel 36 and an additional sprocket wheel 58, the chain 38 is looped around and between sprocket wheels 36 and 58 as before. Another sprocket wheel 59 is fixed on shaft 56 in tandem with sprocket wheel 37. A third chain 60 is looped tautly around and between sprocket wheels 37 and 59 to drive sprocket wheel 58. 58 is keyed to 59 and 37 is keyed to 32, thus an increase in ratio is gained without losing the advantage of a shallow under structure.

Figure 6:
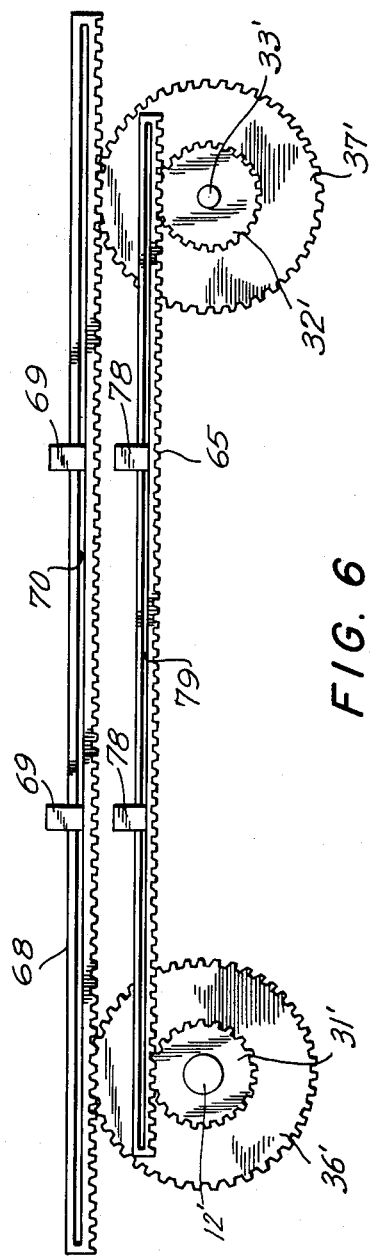

It is within the scope of the invention to replace sprocket wheel 37 with a gear, and sprocket wheel 59 with a herring bone gear or preferably a tight fitting cross tooth gear with a suitable idler gear connection therebetween. Also, sprocket wheels 37 and 59 could be replaced with pinion gears and connected by a rack. In FIGURE 6, pinion gears replace corresponding sprocket wheels of FIGURES 1 to 3 and have the same reference numbers which are differentiated by inclusion of primes ('). Also, racks 65 and 68 replace chains 35 and 38, while rack guides 69 and 78 cooperating with rack slots 70 and 79 replace chain guides 39 and 48. Pinion gears 36' and 31', not being keyed together, are actually idler gears which could be omitted.

Although the invention has been described with a certain degree of particularity, and we have suggested certain alternatives and modifications it is to be understood that these are not intended to be exhaustive, but rather illustrative to help others understand our invention and the principles thereof and to enable them to modify and adapt it according to the requirements of each particular use.

What we claim is:

1. A low profile transfer device for transferring a succession of articles from station to station along a path comprising a machine frame, rest supports mounted on said machine frame for holding said articles at said stations, transfer means movably mounted adjacent to said rest supports for carrying said articles from one rest support to the next, a rotary drive, a drive shaft mounted on said machine frame connected to said drive, a cam wheel on said shaft connected to turn therewith having a low arcuate dwell and a high arcuate dwell and sloped lifting and lowering sections between them, a cam follower engaging the dwells and slopes of said cam wheel, a plurality of lift arms pivotally mounted on said machine frame, linking means interconnecting said lift arms to each other at a distance from their pivots and connecting them to said cam follower, a horizontal motion multiplier means comprising a pair of sprocket wheels connected to rotate together one larger than the other, a second pair of sprocket wheels one larger than the other and in tandem with said first sprocket wheels respectively, a drive chain engaged around and between the larger tandem sprocket wheels, and a second drive chain engaged around and between the smaller tandem sprocket wheels, vertical-lost-motion means connecting said transfer member to said first-named chain on the larger sprockets, a crank on said shaft connected to turn therewith, and a connecting rod one end of which is pivotally connected to the free end of said crank and the other end of which is pivotally connected to said second-named chain on the smaller sprockets.

2. A low profile transfer device for transferring a succession of articles from station to station along a path comprising a machine frame, rest supports mounted on said machine frame for holding said articles at said stations, transfer means movably mounted adjacent to said rest supports for carrying said articles from one rest support to the next, a rotary drive, a drive shaft mounted on said machine frame connected to said drive, a cam wheel on said shaft connected to turn therewith having a low arcuate dwell and a high arcuate dwell and sloped lifting and lowering sections between them, a cam follower engaging the dwell and slopes of said cam wheel, a plurality of lift arms pivotally mounted on said machine frame, linking means interconnecting said lift arms to each other at a distance from their pivots and connecting them to said cam follower, a horizontal motion multiplier means comprising a pinion gear, an input rack slidably mounted on said machine frame constantly engaging said pinion gear, a larger pinion gear mounted to rotate with said first-mentioned pinion gear, and an output rack slidably mounted on said machine frame and engaging said larger pinion gear, a crank secured on said shaft to turn therewith, a connecting rod having one end pivotally connected to the end of said crank and the other end pivotally connected to the input rack, and a vertical-lost-motion means connecting said output rack and said transfer member, whereby an elongated horizontal motion for said transfer means results from said multiplier means.

3. A low profile transfer device for transferring a succession of articles from station to station along a path comprising a machine frame, rest supports mounted on said machine frame for holding said articles at said stations, transfer means movably mounted adjacent to said rest supports for carrying said articles from one rest support to the next, a rotary drive, vertical means connected to said rotary drive for converting the rotary motion of said drive to a controlled vertical component of motion for lifting and lowering said transfer means above and below said rest supports, horizontal means connected to said rotary drive for converting the rotary motion of said drive to controlled horizontal, substantially reciprocating, motion, a horizontal motion multiplier means comprising a drive chain, a pair of sprocket wheels tandemly joined by said drive chain, a second drive chain, a second pair of smaller sprocket wheels tandemly joined by said second drive chain, a third drive chain, a third pair of unequal sprocket wheels tandemly joined by said third drive chain, the larger of said third pair of sprocket wheels being connected to one of the smaller pair and the smaller of said third pair being connected to one of the larger pair, said horizontal means connected to said second drive chain, a vertical-lost-motion means connecting said third drive chain and said transfer member, whereby elongated horizontal motion for said transfer means result from said multiplier means.

References Cited by the Examiner
UNITED STATES PATENTS

| | | | |
|---|---|---|---|
| 2,971,389 | 2/61 | Blatt | 74—110 |
| 2,987,952 | 6/61 | Hengel | 74—37 |

FOREIGN PATENTS

| | | |
|---|---|---|
| 2,448 | 6/80 | Great Britain. |
| 519,025 | 9/39 | Great Britain. |
| 839,002 | 6/60 | Great Britain. |

SAMUEL F. COLEMAN, *Primary Examiner.*

WILLIAM B. LABORDE, ERNEST A. FALLER,
*Examiners.*